United States Patent [19]

Scholl

[11] 3,964,645
[45] June 22, 1976

[54] APPARATUS FOR MELTING AND DISPENSING THERMOPLASTIC MATERIAL
[75] Inventor: Charles H. Scholl, Vermilion, Ohio
[73] Assignee: Nordson Corporation, Amherst, Ohio
[22] Filed: Feb. 12, 1975
[21] Appl. No.: 549,189

[52] U.S. Cl. .......................... 222/146 HE; 219/421; 222/288; 222/325; 222/330; 222/377
[51] Int. Cl.² ...................... B67D 5/62; F27B 14/00
[58] Field of Search ... 222/146 H, 146 HE, 146 HS, 222/377, 288, 333, 334, 330, 331, 325; 219/523, 437, 420, 421

[56] References Cited
UNITED STATES PATENTS

| | | | |
|---|---|---|---|
| 2,740,986 | 4/1956 | Lipscomb et al. | 219/421 X |
| 2,773,496 | 12/1956 | Czarnecki | 222/146 HE X |
| 3,130,876 | 4/1964 | Baker | 222/146 HE |
| 3,531,023 | 9/1970 | Mercer | 222/146 HE |
| 3,876,105 | 4/1975 | Kelling | 222/146 HE |

Primary Examiner—Allen N. Knowles
Assistant Examiner—Hadd Lane
Attorney, Agent, or Firm—Wood, Herron & Evans

[57] ABSTRACT

An apparatus for melting and dispensing thermoplastic material comprising a hopper, a grid melter, a reservoir and a pump. The novel grid melter comprises a plurality of upwardly extending frustoconical melting elements formed on the bottom wall of the melter. The pump is also novel and comprises a unique infeed system for forcibly moving molten material into the pump inlet. The apparatus lends itself to a modular building block concept in which differing manifold blocks, pumps and drive motors, as well as applicators may be utilized in combination with the grid melter and/or reservoir to create differing operating characteristic dispensing systems.

23 Claims, 11 Drawing Figures

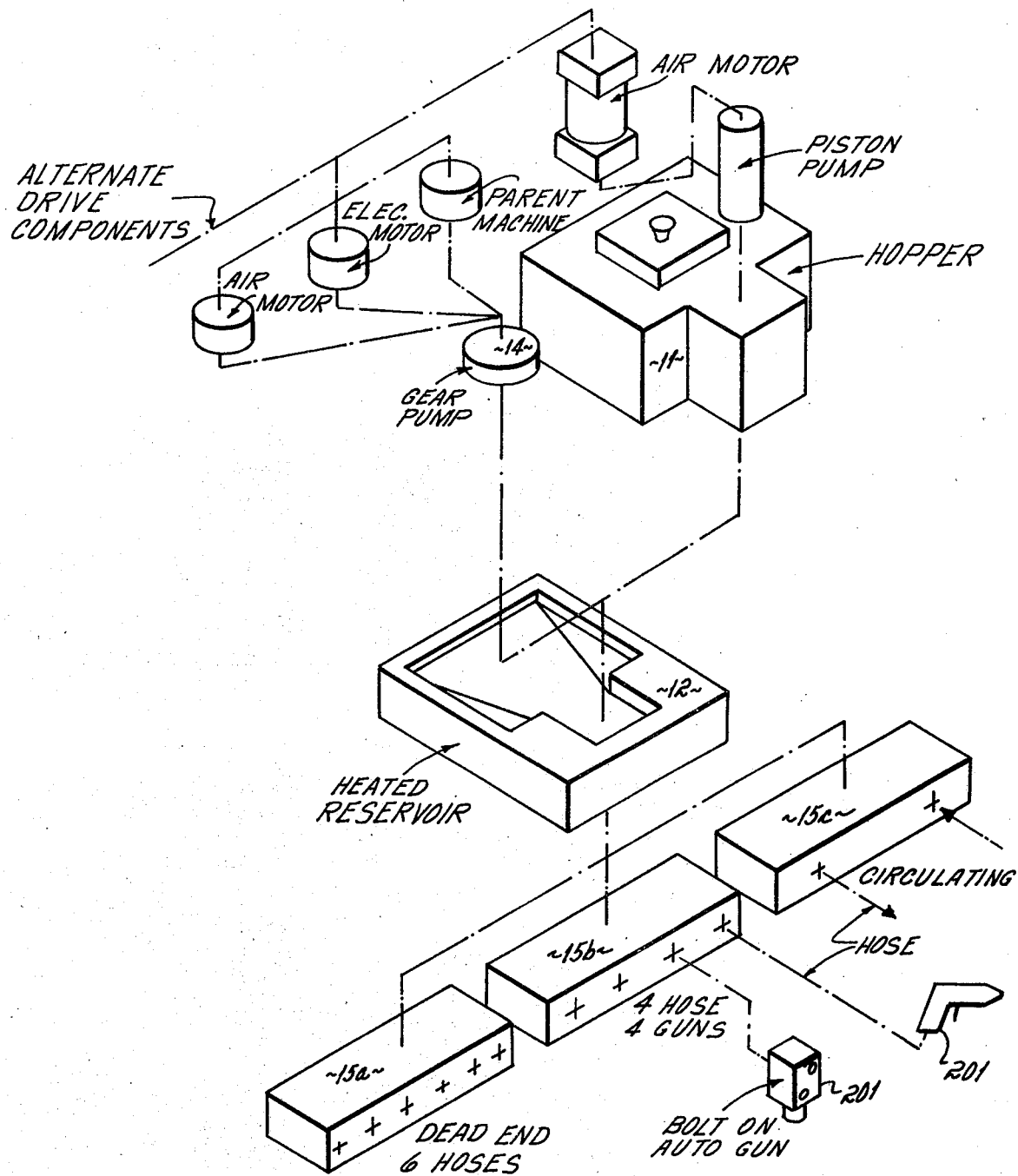

APPARATUS FOR MELTING AND DISPENSING THERMOPLASTIC MATERIAL

This invention relates to apparatus for melting and dispensing thermoplastic material and more particularly to an apparatus for melting and dispensing a large volume of thermoplastic adhesive material with minimal degradation of the molten material prior to application by a dispenser. Conventionally, thermoplastic adhesives or so-called "hot melt" adhesives are converted from a solid to a molten state in a tank having heated walls. The melted material is then maintained in a reservoir in sufficient volume to supply one or more applicators or dispensers. If the job or application requires a substantial volume of hot melt adhesives, a large volume of material must be maintained in the molten or melted state to meet that need. That substantial volume usually necessitates a long warm-up or start-up time for the apparatus as well as prolonged exposure of at least some of the molten material to heat and/or oxygen.

Most thermoplastic adhesive materials oxidize, char or degrade when exposed to heat for any length of time and/or when exposed to oxygen for any appreciable length of time. Consequently, it is desirable to minimize the time that an applicator system maintains the melted material in a molten state. This requires though a balancing of the melt rate of the system with the application rate of the system. Another factor which enters into the balancing equation is that of balancing the capacity of the pump which moves the molten material from the reservoir to the dispenser. In the case of very viscous materials, the pump capacity can be a limiting factor because of the inability of the material to flow into the pump at the rate at which the system is capable of melting or dispensing it.

It has therefore been one object of this invention to provide a method and apparatus for melting and dispensing thermoplastic materials which includes a melter having a very high melt rate and a pump having a very large throughput of viscous materials, such that a very large volume of molten material may be dispensed from this system while maintaining only a minimal reservoir of material in the molten state.

To accomplish this objective the invention of this application incorporates a novel melter having a higher melt rate when compared to melters of alternate prior art configurations of similar size, and/or of equal energy inputs. Such prior melting systems are exemplified by U.S. Pat. Nos. 3,792,801 and 3,531,023. Of course, melt rate can always be increased by increasing the surface temperature of the melter but in the case of hot melt materials this surface temperature is necessarily limited because exposure to excessive temperature results in charring, degrading and deterioration of the adhesive.

The improved melter which accomplishes these objectives comprises a receptacle in which the bottom wall has a plurality of upstanding protrusions, the uppermost end of each of which is shaped as a truncated cone. These protrusions are arranged in rows and columns within the melter such that the bottom wall of the melter when viewed in top plan looks much like an egg crate in which the upstanding protrusions form rows of pockets for the reception of eggs.

Another aspect of this invention is predicated upon a novel method and apparatus for pumping a high viscosity fluid. This novel method and apparatus comprises a pump having a pair of upstanding exposed counter-rotating shafts located adjacent the pump inlet. Molten material is caused to flow into contact with these counter-rotating shafts to which the molten material adheres. It is then removed or scraped from the surfaces of the shafts by inclined scraper surfaces of a hood located above a pump inlet. As the molten material is scraped from the shafts, it is forced by the hood to flow toward and into the pump inlet, thereby effecting a forced infeed into the pump.

Another aspect of this invention is predicated upon the use of the novel melter of this invention as a component or building block of a modular system which comprises a plurality of different manifold blocks, pumps, pump driving motors, and applicators. This modular construction enables the melter to be used in any one of a multiplicity of different operating characteristic systems, depending upon the particular manifold block, pump, drive motor, and dispenser used in the system.

These and other objects and advantages of this invention will be more readily apparent from the following description of the drawings in which:

FIG. 9 is a perspective view of the cap of the gear pump.

FIG. 11 is a diagrammatic illustration similar to FIG. 10 wherein the hopper may be mounted on the reservoir and combined with other modular components to vary the operating characteristics of the system.

Figure 1:
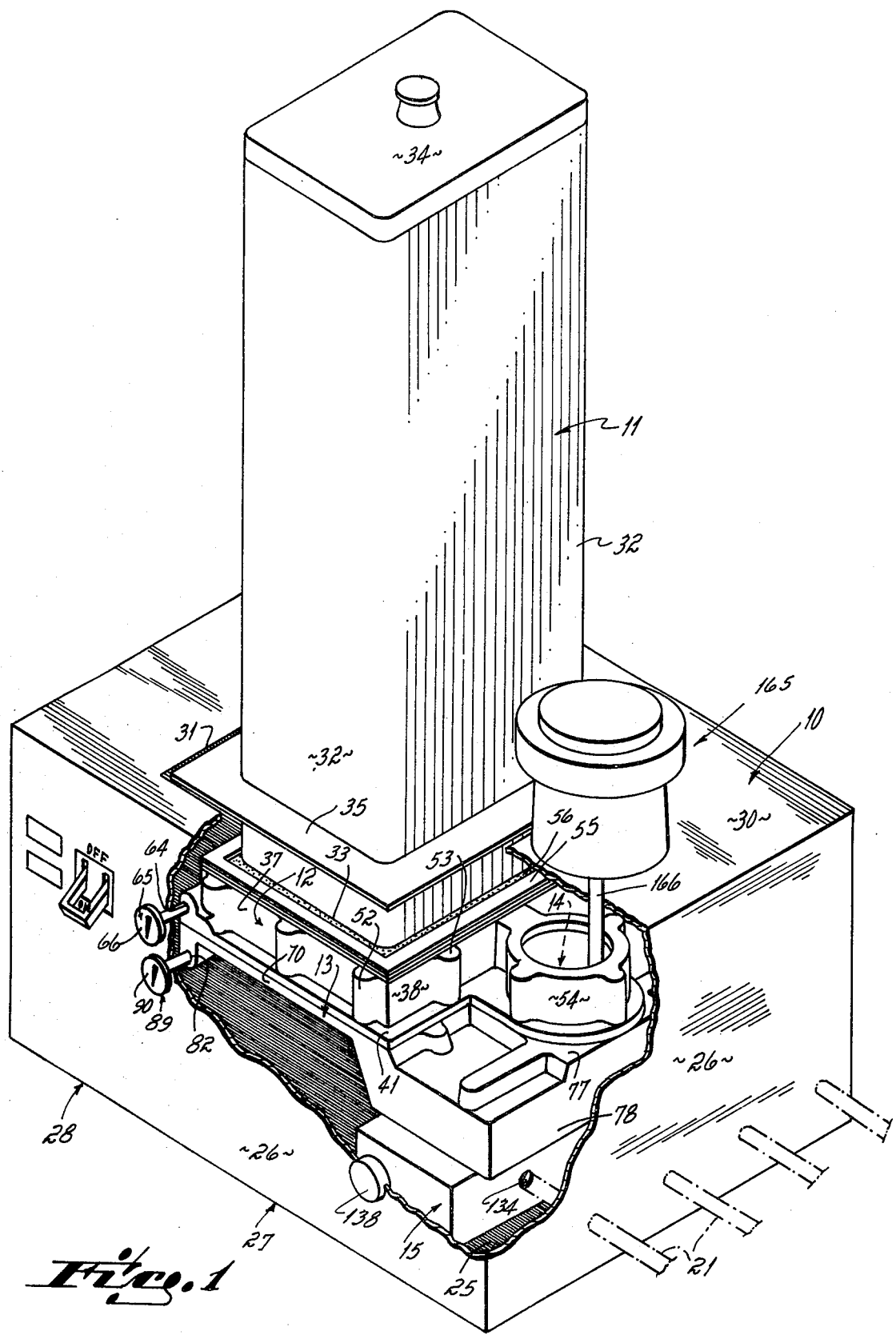
FIG. 1 is a perspective view of one embodiment of a thermoplastic material melting and dispensing apparatus incorporating the invention of this application.
Figure 2:
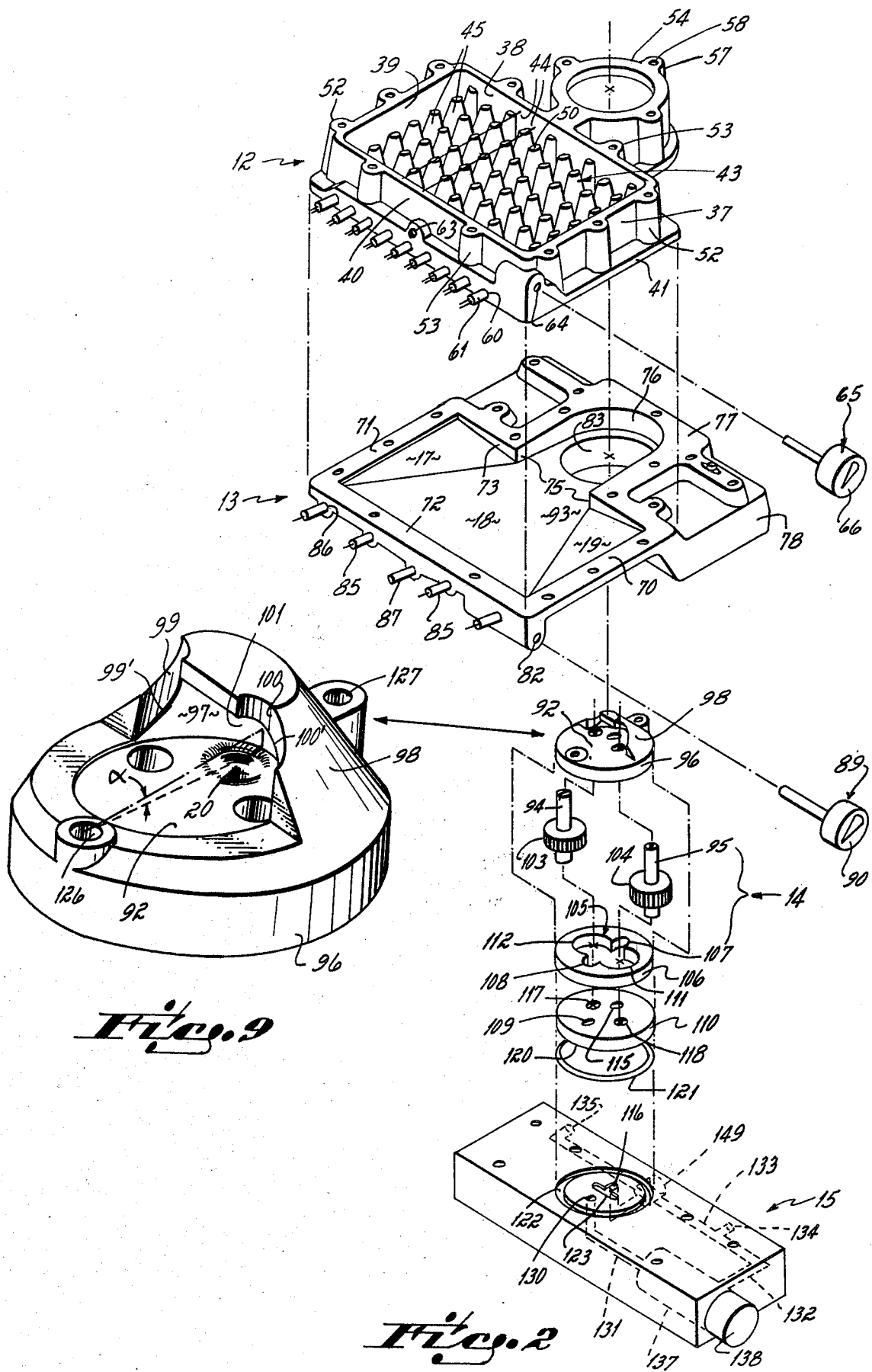
FIG. 2 is an exploded perspective view of a portion of the apparatus of FIG. 1.
Figure 3:
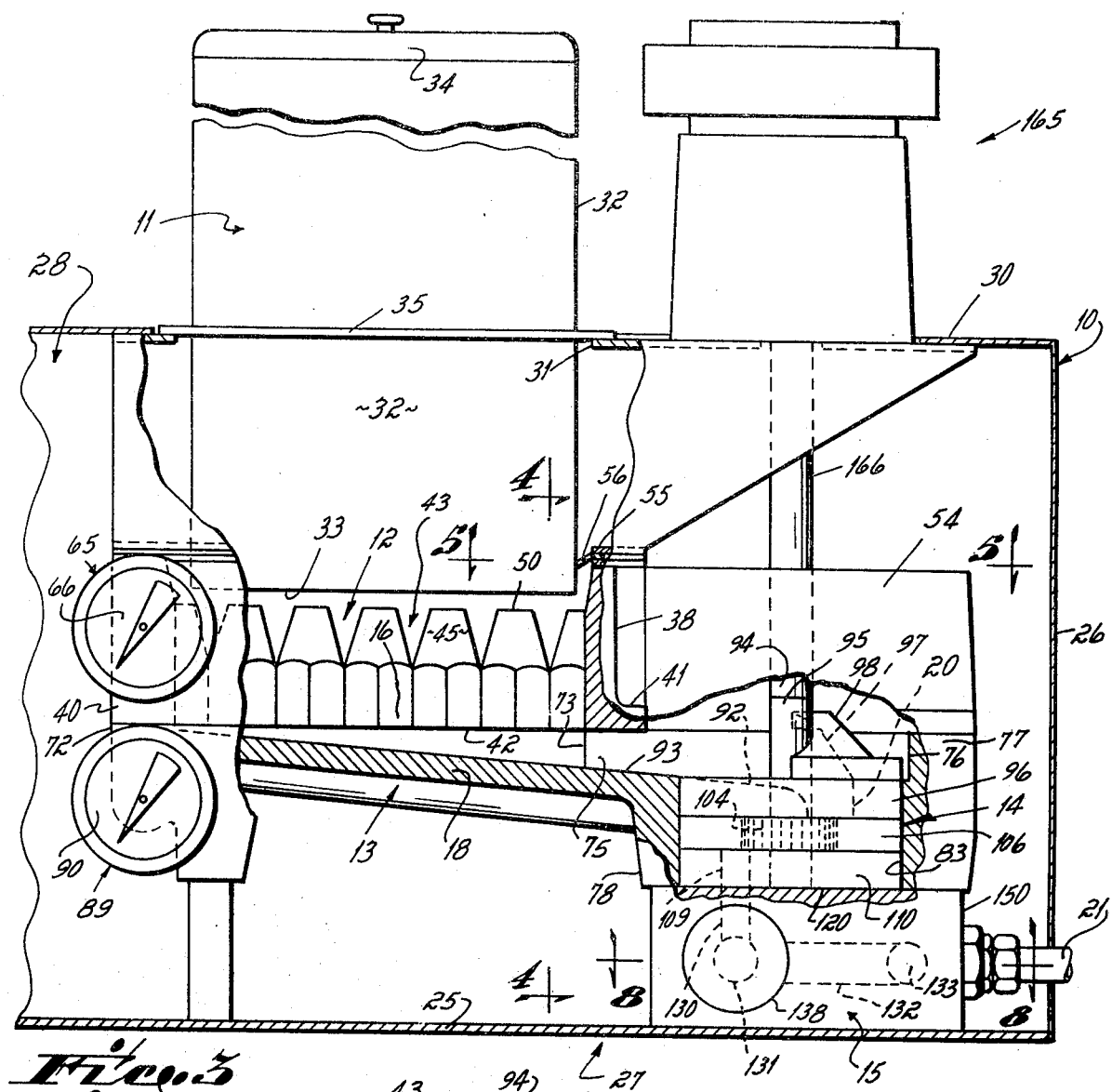
FIG. 3 is a side elevational view, partially broken away, of a portion of the apparatus of FIG. 1.
Figure 4:
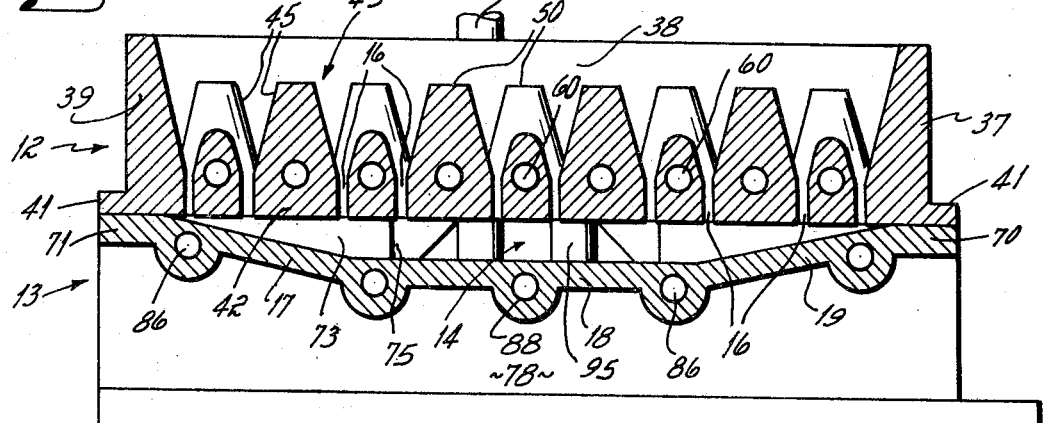
FIG. 4 is a cross sectional view taken on line 4—4 of FIG. 3.

Referring first to FIGS. 1 and 2, it will be seen that the thermoplastic material melting and dispensing apparatus of this invention comprises a housing 10 within which there is located a hopper 11, a grid melter 12, a reservoir 13, a gear pump 14, and a manifold block 15. Solid thermoplastic material in the form of chunks, pellets or blocks are placed in the top of the hopper 11 from which they flow through the open bottom into contact with the top surface of the grid melter 12. The grid melter 12 is heated so that surface contact of the solid thermoplastic material with the top surface of the grid causes the solid thermoplastic material to be melted and converted to a molten state. The molten thermoplastic material then flows downwardly through bottom passageways 16 in the grid melter into the reservoir 13 located immediately beneath the melter 12. The reservoir has sloping bottom walls 17, 18 and 19 which direct the molten material toward the inlet 20 of the pump 14. The pump then moves the molten material into the manifold block 15 from whence it is directed to one or more conventional applicators or dispensers via hoses or conduits 21.

HOUSING, HOPPER

The housing 10 comprises a sheet metal base plate 25 and a shroud 26 mounted atop the base plate. The shroud 26 encloses two sections of the applicator, the melt section 27 and the control section 28. The two sections are separated by an insulative barrier (not shown). Within the control section 28 are all of the electrical components for controlling the temperature of the components throughout the system. These controls form no part of the invention of this application and are conventional in commercially available equipment, as for example equipment of the type shown in U.S. Pat. No. 3,792,901, issued Feb. 19, 1974 and assigned to the assignee of this application.

The top 30 of the shroud has an opening 31 into which there is fitted the hopper 11. The hopper comprises a vertical tube 32, the bottom 33 of which is open and the top of which is closed by a lid 34. Around the periphery of the hopper there is a flange 35 which rests upon and is supported by the top 30 of the housing shroud 26.

GRID MELTER

Referring to FIGS. 2, 3, 4, and 5 it will be seen that the grid melter 12 comprises a receptacle into which solid thermoplastic material flows from the hopper 11. This receptacle comprises four side walls 37, 38, 39 and 40 and a bottom flange 41. The bottom itself comprises a plurality of vertical protrusions or heater elements 43, each one of which is hexagonal in cross section at the base 42 and has an upper end shaped as a truncated cone. The protrusions are arranged in longitudinal rows 44 with the base 42 of each protrusion 45 interconnected and integral with the adjacent protrusions 45 of the same row 44. The protrusions 45 of adjacent rows 44 are longitudinally offset from each of the protrusions of the adjacent rows such that when viewed in top plan as in FIG. 5 the protrusions create a staggered pattern or rows and columns, but with the protrusions of the columns spaced apart and separated by an intermediate row of protrusions. There are open passageways 16 located on opposite sides of each row and extending for the length of the row. These passageways 16 open into the top of the reservoir 13.

Figure 5:
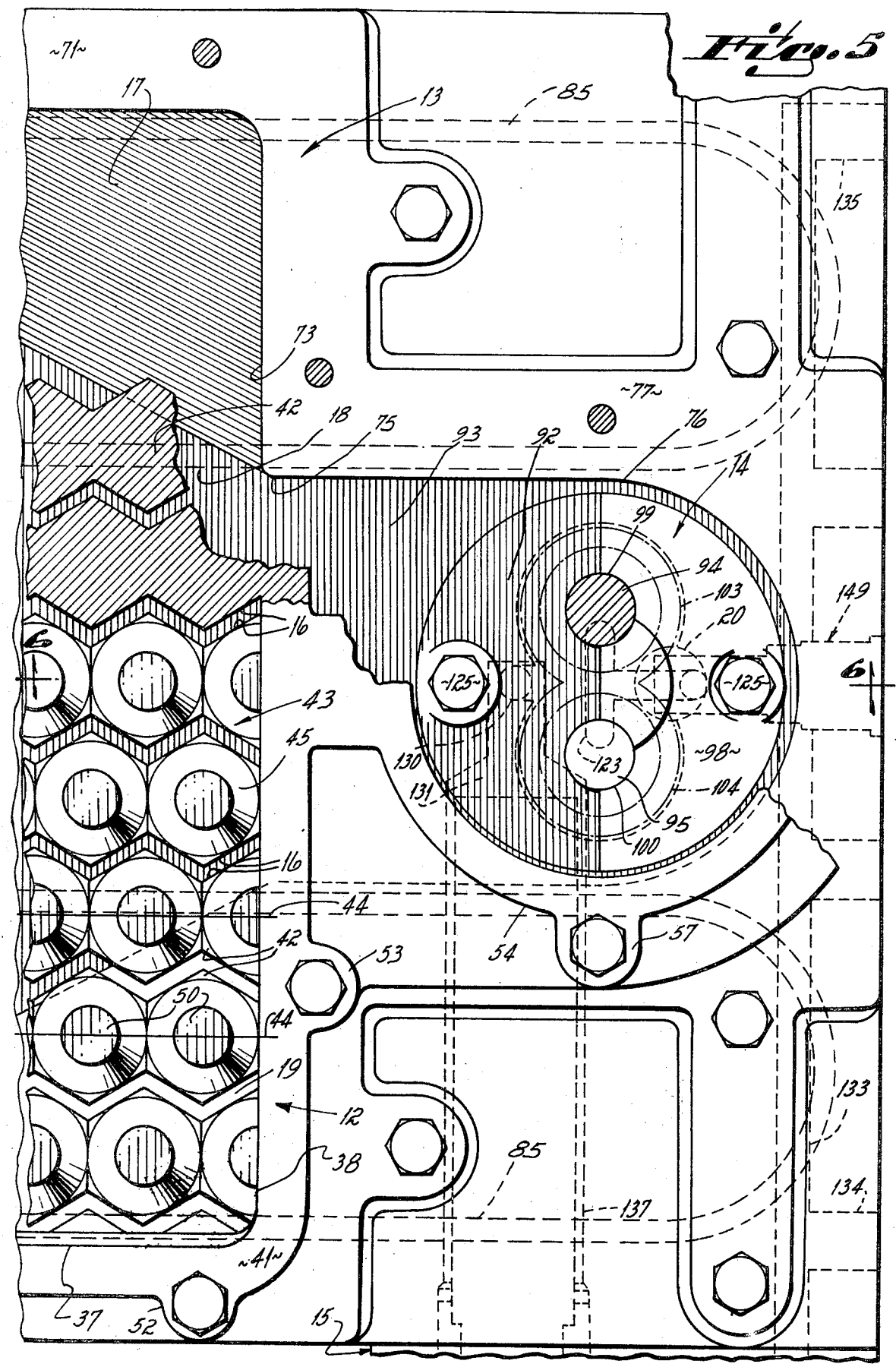
FIG. 5 is a cross sectional view taken on line 5—5 of FIG. 3.

As may be seen in FIG. 5 the passageways conform to the side wall shape of the rows of protrusions. Those side walls, because the bases are hexagonal, create a zig-zag or serpentine shape passage when viewed from the top as in FIG. 5. This pattern of passageways and protrusions results in a grid melter having a very large surface area and a large passageway area. The large surface area results in a high throughput of molten material and the large surface area of the passageway insures that the flow of molten material is not obstructed by lack of flow area.

In the melting of thermoplastic materials it is critical that the melter have a large surface area in contact with the poor heat conductive blocks or pellets of thermoplastic material. Prior to this invention attempts have been made to increase the surface area by forming ribs on the bottom of the grid melter as in U.S. Pat. No. 3,531,023. The grid melter 12 of this invention incorporating the truncated cone shaped heater elements has been found to increase the throughput of the grid melter over rib type grids by as much as 30 or 40% while maintaining the same surface temperature of the grid so as to avoid degrading of the material.

It is also critical to this invention that the protrusions be formed as truncated cones or pyramids having flat or blunt topmost end surfaces 50. As used throughout this application and in the claims the term "cone" is used in the generic sense to include pyramids which have anywhere from three to an infinite number of sides. When the pyramid has an infinite number of sides it is of course circular in cross section. The truncation or blunting of the topmost surface 50 of the "cone" increases the area in contact with the solid thermoplastic material and enables the surface temperature of the complete "cone" to be evenly maintained with a minimal power input.

In one preferred embodiment the grid melter 12 is formed as an integral casting. This casting has three lugs 52 formed on each end wall and a pair of lugs 53 formed on each of the front and rear walls. Each lug is vertically bored to accommodate bolts (not shown) for mounting the grid melter upon the top of the reservoir 13 and securement of a gasket hold-down plate 55 to the top of the grid melter. A gasket 56 is clamped between the top of the grid melter and the hold-down plate 55. It extends inwardly into contact with the side walls 32 of the hopper so as to form a seal to prevent gases from escaping around the edge of the hopper to the atmosphere. The gasket 56 also enables the hopper 11 to be evacuated or to maintain a blanket of inert gas over the top of the thermoplastic material. Such evacuation of the hopper or maintenance of an inert blanket are employed in some applications to retard or minimize degradation of the molten material.

In the preferred embodiment the grid melter has an integral annular boss 54 extending forwardly from its front wall. The boss 54 also has three lugs 57 equidistantly spaced about its outer wall and bored as illustrated at 58 to accommodate bolts (not shown) for mounting the grid melter atop the reservoir.

In the preferred embodiment of the grid melter there are nine horizontal bores 60 which extend through the front wall and through the base portions of each row of heater element protrusions 45. An electrical resistance heater 61 is mounted within each of these bores 60 so that one heater extends into and through the bases of each row of frustoconical heater elements. There is also a bore 63 which extends through the front wall of the melter within which a temperature sensor device (not shown) is mounted. This device is used to control and maintain the temperature of the heater elements 61 at a preset temperature. There is also a transverse bore 64 formed in the front wall of the grid melter block. This transverse bore accommodates a conventional temperature measuring gauge 65, the front face 66 to which is located upon the control panel of the housing 26.

RESERVOIR

The reservoir 13 comprises an open top, closed bottom receptacle which is fixedly secured to the bottom of the grid melter. The reservoir has shallow side walls 70, 71 and a shallow rear wall 72. The front wall 73 is slightly deeper such that the bottom of the reservoir slopes downwardly from the front and side walls toward a front opening 75 in the front wall 73. This opening 75 functions as the entrance for molten material into a blind recess 76 formed in a pump mounting boss 77 of the reservoir. The blind recess 76 of the pump mounting boss 77 is intersected by a vertical bore 83 which extends from the bottom of the boss 77 into the recess 76. The pump 14 is located within this bore 83 and bolted to the manifold block 15.

The boss 77 has a base portion 78, the bottom flat surface of which rests atop and is supported by the manifold block 15. The manifold block in turn rests upon and is supported from the base 25 of the housing. The manifold block 15 and pump mounting boss 77 of the reservoir are secured together by bolts (not shown) which extend through and are threaded into aligned vertical bores.

In the preferred embodiment there are two electrical U shaped resistance heaters 85 molded within the bottom walls 17, 18 and 19 of the reservoir. There is also a tube 87 molded within the bottom wall 18. A temperature sensor is inserted into the tube 87 and is utilized to control the flow of electrical current to the heaters 85 so as to maintain the bottom wall at a preset temperature. There is also a transverse bore 82 located beneath the side wall of the reservoir. This bore 82 accommodates a conventional temperature measuring gauge 89, the front face 90 of which is located on the control panel of the housing 26. The heaters 85, as shown in FIG. 5, are positioned on opposite sides of the pump 14 to insure uniform heating of the pump 14 and manifold 15.

PUMP

The pump 14 has a top surface 92 which is co-planar with and forms a continuation of the sloping surface 93 of the reservoir bottom wall 18. In the preferred embodiment it slopes at an angle of approximately 5° to the horizontal plane. The slope is such that the natural flow of molten material over the bottom wall of the reservoir is toward the pump inlet 20.

One of the problems I encountered in connection with the dispensing of hot melt material from this apparatus was that of maintaining a sufficient flow of molten material into the pump 14 to match the capacity of the melter and/or the dispenser. Specifically, I found that the high viscosity of the molten material often retarded the rate of inflow of the molten adhesive into the pump with the result that the flow rate of the material into the pump limited the capacity of the system.

To overcome this problem the pump 14 comprises a novel liquid feed method and apparatus for increasing the input of high viscosity material into the pump. Specifically, it includes a pair of counter-rotating shafts 94, 95 which extend above the top surface 92 of the pump and which tend because of their rotation to force material between the two toward an overhanging rear wall 97 formed on the inside of an overhanging hood 98. The wall 97 overhangs the entrance port 20 of the pump and slopes toward the entrance port so that material contacting the wall 97 is caused to flow toward the inlet port 20 of the pump. The overhanging hood 98 also includes a pair of downwardly sloping surfaces 99, 100 which wrap around and contact or very nearly contact the peripheral surface of the counter-rotating shafts 94, 95. The lower inside edges 99', 100' of each of these sloping surfaces 99, 100 forms a spiral edge which acts as a scraper to scrape molten material adhered to the shaft from contact with it. As the material is scraped from the shaft it is forced to flow downwardly within an entrapment chamber 101 formed beneath the inclined surface 97 of the hood 98.

With reference to FIG. 9 it will be seen that as the leftwardmost shaft, the drive shaft 94 of the pump 14, is caused to rotate in a counterclockwise direction and the idler shaft is caused to rotate in a clockwise direction, molten material flowing toward the pump inlet 20 enters between the two shafts and at least a portion of that molten material contacts the shafts. Upon contact with the counter-rotating shafts, the molten material adheres to them and is caused to rotate with the shafts until it comes into contact with the inclined scraper edges 99', 100'. Upon contact with the scraper surfaces 99, 100 the molten material is scraped from the counter-rotating shafts and forced to flow downwardly within the entrapment chamber 101 toward the pump entrance 20. Consequently, the counter-rotating shafts and cooperating scrapers effect a forced infeed of molten material into the pump inlet 20, also disrupting the natural tendency of the formation of a vortex. Elimination or avoidance of the vortex has the effect of reducing the possibility of pump cavitation and/or introduction of air into the molten material.

The remainder of the pump, other than the end plate 96 and the associated infeed mechanism comprise a conventional commercially available gear pump. Specifically, the remainder of the pump comprises a pair of interconnected gears 103, 104 which are drivingly keyed to the drive shaft 94 and idler shaft 95. These gears rotate within a generally four leaved clover-shaped recess 105 of the gear stator 106. One "leaf" 107 of the clover-shaped opening in the stator 106 is open to communicate with the inlet port 20 and the opposite "leaf" 108 of the recess communicates with an outlet port 109 of a lower end plate 110. The other "leaves" 111 and 112 of the clover-shaped recess 105 accommodate the counter-rotating inter-engaged gears.

The lower end plate 110 includes in addition to the outlet port 109, a pressure balancing port 115 which extends through the end plate 110 and communicates with a pressure balancing port 116 of the manifold block 15. Additionally, the end plate 110 includes a pair of vertical apertures 117 and 118 which accommodate the lower ends of the shafts 94, 95 and function as bearings or journals for those lower ends. Between the bottom surface 120 of the end plate 110 and the top surface of the manifold block 15 there is a conventional O-ring 121 which fits within a semi-circular cross sectional annular ring 122 in the top surface of the manifold block. This O-ring 121 functions as a seal between the bottom surface of the reservoir 13 and the top surface of the manifold 15. Except for this seal between the manifold and the reservoir 13 there are no gaskets or seals. While leakage does occur around the periphery of the shafts 94, 95 within the pump that leakage is accommodated by permitting it to flow through a T-shaped slot 123 in the top surface of the manifold block back to the inlet or suction side of the pump.

With reference to FIG. 2 it will be seen that the T-shaped slot 123 interconnects the vertical bores 117, 118 of the lower end plate as well as the vertical port 115 of the end plate. Consequently, leakage of molten material flowing between the rotating shafts 94, 95 and the inside surface of the bores 117, 118 is simply routed through the T-shaped slot 123 back to the suction side of the pump through the connecting bore 115 of the pump end plate 110.

The pump 14 is secured to the top of the manifold block by bolts 125 which extend vertically through vertical bores 126, 127. In the preferred embodiment of the pump, spacer sleeves 128, 129 are located within the bores 126, 127 between the bolts and the inner surfaces of the bores 126, 127.

MANIFOLD BLOCK

The manifold block 15 is ported such that the molten material flowing from the outlet port 109 of the pump flows into the vertical inlet port 130 of the manifold. This inlet port communicates with a longitudinal passage 131, a transverse passage 132, a longitudinal passage 133 on the front side of the block and outlet ports 134 and 135. Conventional dispensers, as for example conventional hot melt applicator guns or dispensers of the type shown in United States Reissue Pat. No. 27,865 or U.S. Pat. No. 3,690,518 may be attached to the outlet ports 134, 135 of the manifold block, either directly or by conventional heated hoses. The number of outlet ports and connected dispensers will vary depending upon the particular application to which the system is applied.

Intersecting the longitudinal passageway 131 and extending coaxially with it there is a filter mounting bore 137. This bore accommodates a conventional filter, one end of which comprises a plug 138 threaded into a threaded end section 139 of the bore 137. This plug has attached to it a fluted central core 140 over the exterior of which there is a filter screen 141. A complete description of the filter assembly may be found in U.S. Pat. No. 3,224,590 which issued Dec. 21, 1965. Hot melt material flowing into the manifold block flows through the passage 131 to the exterior of the filter screen 141. It then flows through the filter 141 into the flutes 142 of the core of the filter, along the flutes 142, beneath a collar 143 and into an annular channel 145 of the manifold block which surrounds the inner end 147 of the filter plug 138. This annular passage 145 communicates with the transverse passage 132 of the manifold block and the interconnected longitudinal passage 133.

Intersecting the longitudinal passage 133 there is a one-way check valve mounting bore 149 which extends inwardly from the front surface 150 of the manifold block into communication with the pressure balancing port 116. This check valve mounting bore also intersects the longitudinal passage 133 in the front of the manifold. Threaded into the bore 149 there is a conventional pressure relief one-way check valve 152. This valve comprises a valve body 153 having a central bore 154 therein. The forwardmost end of the bore is stepped to a smaller diameter end section 155 which communicates with a transverse bore 156 of the valve body 153. There is also a transverse bore 157 which extends through the inner end of the valve body 153 and interconnects the large diameter section of the valve body bore 154 with the inner end 158 of the body mounting bore 149 and consequently with the pressure balancing port 116 of the manifold.

Mounted interiorly of the check valve body 153 there is a spring 160 which biases a check valve ball 161 into closed engagement with a shoulder 162 of the check valve.

In operation, high pressure molten material flows through the passage 133 and the outlet ports 134, 135 of the manifold block to the hot melt dispensers or applicators. In the event of excesssive pressure build-up within the hoses, the dispensers or the manifold block, the high pressure condition will be relieved by opening of the ball check valve 152 and resulting flow of the high pressure molten material through the transverse passage 156 of the check valve 152, the bore 154, the transverse passage 157 and back through the passage 116 to the T-shaped slot 123 and to the inlet port of the pump. This check valve thus will always relieve any over pressure condition without any breakage or damage to the applicator equipment.

PUMP DRIVE SYSTEM

Figure 6:
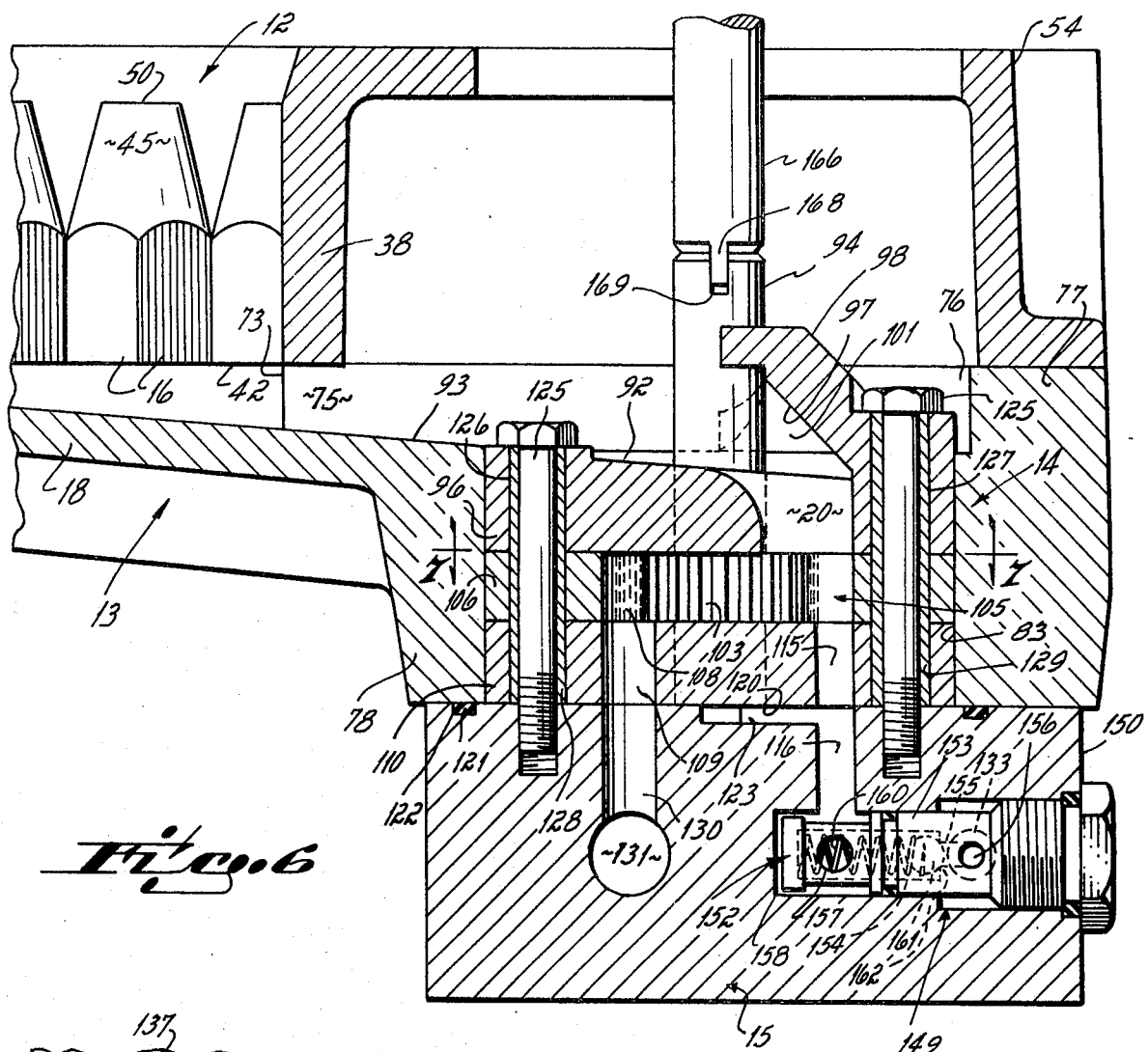
FIG. 6 is a cross sectional view taken on line 6—6 of FIG. 5.
Figure 8:
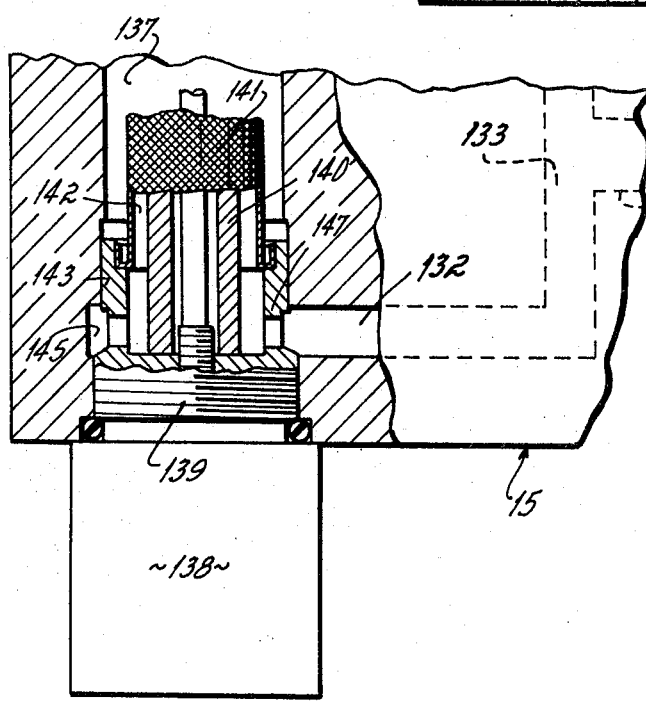
FIG. 8 is a cross sectional view through a portion of the manifold block taken on line 8—8 of FIG. 3.
Figure 7:
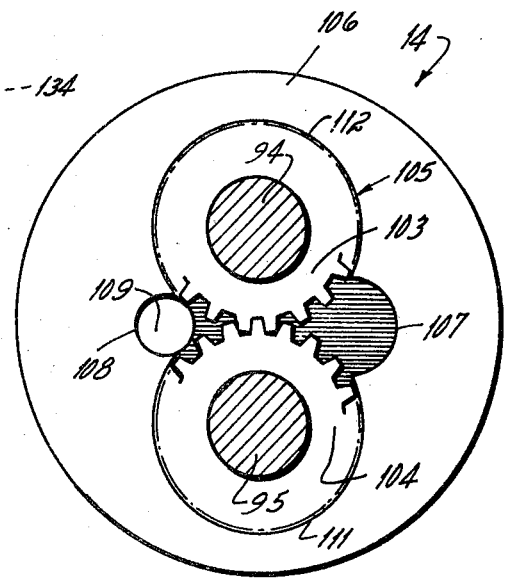
FIG. 7 is a cross sectional view through the gear pump of the apparatus taken on line 7—7 of FIG. 6.

The pump 14 may be driven in rotation by any conventional type of drive motor 165 and interconnected drive shaft 166. In the preferred embodiment illustrated in FIGS. 3 and 6, the motor drive shaft has a key 168 on its outer end which fits within a key-way slot 169 at the upper end of the pump drive shaft 94. The motor is mounted atop the shroud 26 of the housing. In one preferred embodiment of the invention, the motor 165 is a rotary pneumatic motor driven by conventional shop air pressure and operative to effect rotation of the shaft 166 at a predetermined speed through a conventional gear reduction unit mounted interiorly of the motor housing.

MODULAR APPLICATOR SYSTEM

Figure 10:
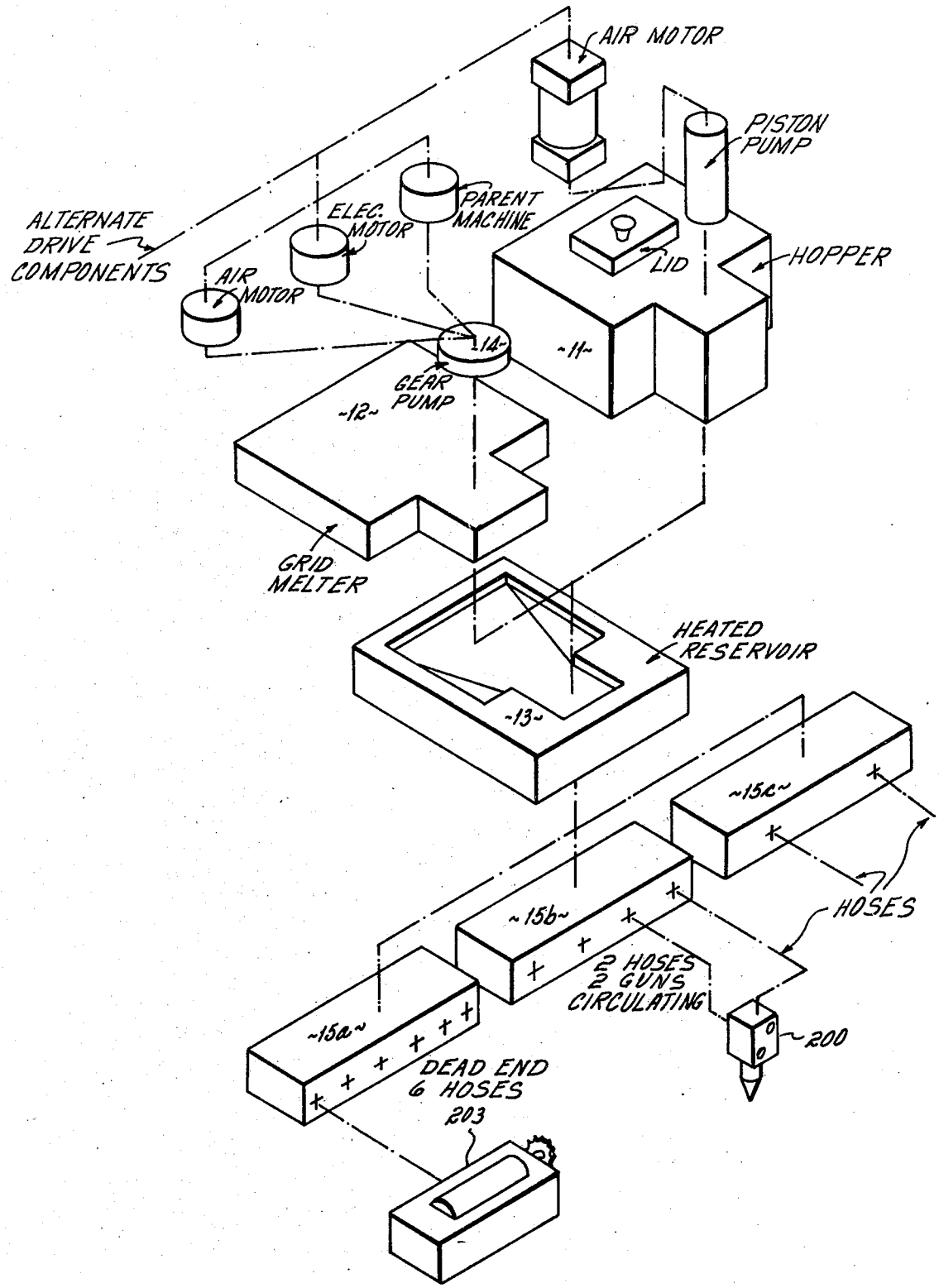
FIG. 10 is a diagrammatic illustration of the manner in which the melter and reservoir section of the machine may be used with other modular components to vary the operating characteristics of the system.

Referring now to FIGS. 10 and 11 there is illustrated diagrammatically the manner in which the hopper 11, grid melter 12 and reservoir 13 of this system may be utilized in a modular applicator system having multiple varying operating conditions. As an example, the hopper, grid melter and reservoir may be used with any of many varying configurations of manifold blocks 15a, 15b, 15c to effect connection of the system to one or more dispensers. The manifold blocks in addition to having a varying number of outlets may also be bored to accommodate continuous circulating flow dispensers 200 as well as non-circulating discontinuous type applicators 201. Depending upon the operating characteristics of the system, the pump may be a gear pump 14 of the type described hereinabove or it may alternatively be a reciprocating piston pump of the type shown in U.S. Pat. No. 3,792,801. The choice of pumps depends upon the operating conditions of the system. Additionally, the pump irrespective of whether it is of the reciprocation or rotary type, may employ any one of several different types of drive motors, as for example electrically operated motors 202 or pneumatically operated motors 203 or a mechanical drive mechanism of a machine to which the applicator may be attached; e.g., a continuous bag gluing machine.

As an alternative to conventional circulating or non-circulating gun or valve type dispensers 200, 201 the modular applicator system described hereinabove may also be used to supply molten adhesive to wheel type applicators 203. One such wheel type applicator 203 with which the invention is applicable is completely described in pending United States Patent Application Ser. No. 536,730, filed Dec. 27, 1974 and assigned to the assignee of this application. When the modular applicator system of this invention is used as a supply source for a wheel type applicator 203, the gear pump 14 will usually be mechanically driven by a parent machine (not shown) to which the adhesive applicator wheel 203 is attached, e.g. a continuous web type labeling machine in which a pressure sensitive adhesive is applied to a web of labels.

Referring to FIG. 11 there is illustrated still another application of the modular applicator system of this invention. As there illustrated the grid melter 12 may be completely eliminated from the system and the hopper 11 mounted directly atop the heated reservoir 13. This application of the system, sans grid melter, is only applicable to that class of adhesives which must be melted in a batch type melter as opposed to a grid type melter. One example of this class of adhesive which is best melted in a batch type melter is "Kraton No. 1101," manufactured by Shell Chemical Co. This is a pressure sensitive adhesive which is inherently tacky at ambient temperature.

It will readily be seen that the invention of the application lends itself to a modular applicator system. The very high flow rate or melt rate of the grid melter particularly enables it to be utilized with many different operating characteristic systems. The pump because of its high throughput and force infeed system also is applicable to many different styles and operating characteristic systems, whether for dispensing hot melt adhesives, paint or other liquid materials.

When used in other systems the forced infed of the pump may also be varied in some applications. It may be desirable to place two end plates identical to the end plate 96 on the opposite ends of the pump. In the event of a dual forced infeed from opposite ends of the pump, the pump will be placed on its side with the entrapment chamber 101 opening upwardly.

While I have described in detail only one preferred embodiment of my improved method and apparatus for dispensing thermoplastic material, it will be appreciated that numerous changes and modifications may be made in the apparatus without departing from the spirit of my invention. Therefore, I do not intend to be limited except by the scope of the following claims.

I claim:

1. An apparatus for converting solid thermoplastic material to molten thermoplastic material and for dispensing the molten thermoplastic material comprising,
   a grid melter having a continuous side wall, a bottom wall, and an open top for receiving said solid thermoplastic material,
   at least one discharge opening in said bottom wall,
   a reservoir mounted beneath said grid melter, and adapted to receive molten material from said discharge opening,
   means for heating said bottom wall of said grid melter,
   a dispenser selectively operable to dispense said molten thermoplastic material,
   a pump at least partially mounted within said reservoir for supplying said molten thermoplastic material from said reservoir to said dispenser,
   the improvement which comprises,
   plurality of rows and columns of heating elements extending upwardly from said bottom wall of said grid melter, each of said heating elements having a base portion and an upper end portion, each of said upper end portions being shaped as a truncated cone, each of said truncated cone shaped portions of each of said heating elements having a bottom of at least twice the cross sectional area as the top and having a substantial taper between said bottom and top.

2. An apparatus for converting solid thermoplastic material to molten thermoplastic material and for dispensing the molten thermoplastic material comprising,
   a grid melter having a continuous side wall, a bottom wall, and an open top for receiving said solid thermoplastic material,
   at least one discharge opening in said bottom wall,
   a reservoir mounted beneath said grid melter, and adapted to receive molten material from said discharge opening,
   mmeans for heating said bottom wall of said grid melter,
   a dispenser selectively operable to dispense said molten thermoplastic material,
   a pump at least partially mounted within said reservoir for supplying said molten thermoplastic material from said reservoir to said dispenser,
   the improvement which comprises,
   a plurality of rows and columns of heating elements extending upwardly from said bottom wall of said grid melter, each of said heating elements having a base portion and an upper end portion, each of said upper end portions being shaped as a truncated cone, and
   said heating means comprising a plurality of electrical heaters, each of said electrical heaters extending through the base portions of one row of said heater elements.

3. An apparatus for converting solid thermoplastic material to molten thermoplastic material and for dispensing the molten thermoplastic material comprising,
   aa grid melter having a continuous side wall, a bottom wall, and an open top for receiving said solid thermoplastic material,
   at least one discharge opening in said bottom wall,
   a reservoir mounted beneath said grid melter, and adapted to receive molten material from said discharge opening,
   means for heating said bottom wall of said grid melter,
   a dispenser selectively operable to dispense said molten thermoplastic material,
   a pump at least partially mounted within said reservoir for supplying said molten thermoplastic material from said reservoir to said dispenser,
   the improvement which comprises,
   a plurality of rows and columns of heating elements extending upwardly from said bottom wall of said grid melter, each of said heating elements having a base portion and an upper end portion, each of said upper end portions being shaped as a truncated cone,
   said heating elements of each of said rows being longitudinally offset relative to the heating elements in the next adjacent row so that said heating elements form an offset staggered pattern when viewed in top plan.

4. An apparatus for converting solid thermoplastic material to molten thermoplastic material and for dispensing the molten thermoplastic material comprising,
   a grid melter having a continuous side wall, a bottom wall, and an open top for receiving said solid thermoplastic material,
   at least one discharge opening in said bottom wall,
   a reservoir mounted beneath said grid melter, and adapted to receive molten material from said discharge opening,
   means for heating said bottom wall of said grid melter,
   a dispenser selectively operable to dispense said molten thermoplastic material, a pump at least partially mounted within said reservoir for supplying said molten thermoplastic material from said reservoir to said dispenser, the improvement which comprises, a plurality of rows and columns of heating elements extending upwardly from said bottom wall of said grid melter, each of said heating elements having a base portion and an upper end portion, each of said upper end portions being shaped as a truncated cone, and said discharge opening in said bottom wall comprising a plurality of openings which extend generally parallel to said rows of heater elements.

5. An apparatus for converting solid thermoplastic material to molten thermoplastic material comprising, a grid melter having a continuous side wall, a bottom wall and an open top for receiving said solid thermoplastic material, at least one discharge opening in said bottom wall, a reservoir mounted beneath said grid melter and adapted to receive molten material from said discharge opening, means for heating said bottom wall of said grid melter, and the improvement which comprises, a plurality of rows and columns of heating elements extending upwardly from said bottom wall of said grid melter, each of said heating elements having a base portion and an upper end portion, each of said upper end portions being shaped as a truncated cone, each of said cone shaped portions of each of said heating elements having a bottom of at least twice the cross sectional area as the top and having a substantial taper between said bottom and said top.

6. An apparatus for converting solid thermoplastic material to molten thermoplastic material comprising, a grid melter having a continuous side wall, a bottom wall and an open top for receiving said solid thermoplastic material, at least one discharge opening in said bottom wall, a reservoir mounted beneath said grid melter and adapted to receive molten material from said discharge opening, means for heating said bottom wall of said grid melter, and the improvement which comprises, a plurality of rows and columns of heating elements extending upwardly from said bottom wall of said grid melter, each of said heating elements having a base portion and an upper end portion, each of said upper end portions being shaped as a truncated cone, and said heating means comprising a plurality of electrical heaters, each of said electrical heaters extending through the base portion of one row of said heater elements.

7. An apparatus for converting solid thermoplastic material to molten thermoplastic material comprising, a grid melter having a continuous side wall, a bottom wall and an open top for receiving said solid thermoplastic material, at least one discharge opening in said bottom wall, a reservoir mounted beneath said grid melter and adapted to receive molten material from said discharge opening, means for heating said bottom wall of said grid melter, and the improvement which comprises, a plurality of rows and columns of heating elements extending upwardly from said bottom wall of said grid melter, each of said heating elements having a base portion and an upper end portion, each of said upper end portions being shaped as a truncated cone, said heating elements in each of said rows being longitudinally offset relative to the heating elements the next adjacent row so that said heating elements form an offset staggered pattern when viewed in top plan.

8. An apparatus for converting solid thermoplstic material to molten thermoplastic material comprising, a grid melter having a continuous side wall, a bottom wall and an open top for receiving said solid thermoplastic material, at least one discharge opening in said bottom wall, a reservoir mounted beneath said grid melter and adapted to receive molten material from said discharge opening, means for heating said bottom wall of said grid melter, and the improvement which comprises, a plurality of rows and columns of heating elements extending upwardly from said bottom wall of said grid melter, each of said heating elements having a base portion and an upper end portion, each of said upper end portions being shaped as a truncated cone, and said discharge opening in said bottom wall comprising a plurality of openings which extend generally parallel to said rows of heater elements.

9. A modular apparatus for converting solid thermoplastic material to molten thermoplastic material and for dispensing the molten thermoplastic material comprising, a grid melter having a continuous side wall, a bottom wall, and an open top for receiving said solid thermoplastic material, said bottom wall having, a plurality of rows and columns of heating elements extending upwardly from said bottom wall, each of said heating elements having a base portion and an upper end portion, each of said upper end portions being shaped as a truncated cone, at least one discharge opening in said bottom wall, a reservoir mounted beneath said grid melter, and adapted to receive molten material from said discharge opening, means for heating said bottom wall of said grid melter, means for mounting a plurality of differing manifold blocks upon said reservoir, a plurality of manifold blocks adapted to be selectively secured to said manifold block mounting means, each of said manifold blocks being adapted to accommodate differing numbers of applicators, means for mounting any one of a plurality of differing pumps having different operating characteristics upon said apparatus, a plurality of differing operating characteristic pumps adapted to be selectively mounted upon said pump mounting means, said pumps when mounted upon said pump mounting means being at least partially located within said reservoir, means for mounting any one of a plurality of motors upon said pump, and a plurality of motors having differing operating characteristics adapted to be mounted upon said motor mounting means.

10. The modular apparatus of claim 9 in which said plurality of pumps includes at least one reciprocating piston type pump and at least one rotary gear type pump.

11. The modular apparatus of claim 9 in which said plurality of motor means comprises at least one electric motor and at least one pneumatic motor.

12. The modular apparatus of claim 9 which further includes a plurality of dispensers, each of said dispensers being selectively operable in combination with at least one of said manifold blocks.

13. Apparatus for melting thermoplastic material and dispensing it in molten condition comprising;
 a housing having a hopper formed therein for receiving unmelted thermoplastic material;
 a flow-through grid melter for melting said thermoplastic material, said grid melter being mounted upon said housing,
 said grid melter comprising a plurality of segmental sections, each of said segmental sections having a lower portion and an upper portion; said upper portion of each of said segmental sections being shaped as a truncated cone;
 heater means disposed in said lower portions of said segmental sections;
 at least two of said segmental sections being spaced apart to form a fluid flow passageway therebetween, and
 a reservoir mounted beneath said grid melter for receiving and storing melted thermoplastic material.

14. The apparatus of claim 13 wherein said frustoconical upper portions of adjacent segmental sections are longitudinally offset from frustoconical upper portions of adjacent segmental sections so that said protrusions form a staggered offset pattern when viewed in top plan.

15. The apparatus of claim 13 wherein said passageway is continuous for the length of said grid melter.

16. The apparatus of claim 13 wherein said segmental sections are arranged in rows and wherein said passageway extends generally parallel to the length of said rows.

17. The apparatus of claim 13 wherein said heater means comprises an electrical resistance heating element disposed in the lower portion of each of said segmental sections.

18. The apparatus of claim 13 wherein said lower portions of said grid melter segmental sections having surfaces which form rows of undulating patterns on opposite sides and along the length of said segmental sections.

19. Apparatus of claim 18 wherein said frustoconical shaped upper portions of said segmental sections transitionally conform to the shape of said lower portions of said protrusions.

20. Apparatus of claim 13 wherein said reservoir extends to one side of said grid melter.

21. The apparatus of claim 20 wherein a hydraulic pump is disposed in said reservoir at said one side thereof.

22. The apparatus of claim 21 in which said reservoir is formed with bottom walls with heater means disposed in said walls.

23. A modular apparatus for converting solid thermoplastic material to molten thermoplastic material and for dispensing the molten thermoplastic material comprising,
 a hopper for receiving solid thermoplastic material,
 a reservoir adapted to receive solid thermoplastic material from said hopper,
 heater means disposed in the bottom of said reservoir for melting said solid thermoplastic material to a molten state,
 means for mounting a plurality of different manifold blocks to said reservoir,
 a plurality of manifold blocks adapted to be selectively secured to said manifold block mounting means, each of said manifold blocks being adapted to accommodate differing numbers of applicators,
 means for mounting any one of a plurality of differing pumps having different operating characteristics to one end of said reservoir,
 a plurality of pumps having different operating characteristics adapted to be selectively secured to said pump mounting means, said pumps being at least partially disposed within said reservoir when mounted upon said pump mounting means,
 means for mounting any one of a plurality of motors upn said pumps, and
 a plurality of motors having differing operating characteristics adapted to be mounted upon said motor mounting means.

* * * * *